United States Patent
Li et al.

(10) Patent No.: US 11,200,400 B2
(45) Date of Patent: Dec. 14, 2021

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventors: Mengping Li, Shenzhen (CN); Canhong Du, Shenzhen (CN); Songjin Zhong, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 12 days.

(21) Appl. No.: 16/714,704

(22) Filed: Dec. 14, 2019

(65) Prior Publication Data

US 2020/0117878 A1 Apr. 16, 2020

Related U.S. Application Data

(63) Continuation of application No. PCT/CN2019/086886, filed on May 14, 2019.

(30) Foreign Application Priority Data

Jun. 15, 2018 (WO) ................ PCT/CN2018/091641

(51) Int. Cl.
*G06K 9/00* (2006.01)
*G02B 5/30* (2006.01)
(Continued)

(52) U.S. Cl.
CPC ....... *G06K 9/00046* (2013.01); *G02B 5/3083* (2013.01); *G06K 9/00013* (2013.01); *H01L 27/3234* (2013.01); *H01L 27/14678* (2013.01)

(58) Field of Classification Search
CPC .. G06K 9/00; G06K 9/00046; G06K 9/00013; G02B 5/3083; H01L 27/3234; H01L 27/14678
See application file for complete search history.

(56) References Cited

U.S. PATENT DOCUMENTS

| 6,147,738 A | 11/2000 | Okamoto |
| 2009/0021487 A1 | 1/2009 | Tien |

(Continued)

FOREIGN PATENT DOCUMENTS

| CN | 105184282 A | 12/2015 |
| CN | 106067018 A | 11/2016 |

(Continued)

*Primary Examiner* — Lixi C Simpson
(74) *Attorney, Agent, or Firm* — Scully Scott Murphy & Presser

(57) ABSTRACT

A fingerprint identification apparatus and an electronic device applicable to an electronic device having a display screen, including: an optical function layer, disposed between the display screen and a middle frame of the electronic device, wherein the optical function layer includes a quarter-wave plate and a polarizer, and the polarizer is disposed under the quarter-wave plate; and an optical fingerprint module, disposed under the optical function layer, and configured to receive a fingerprint optical signal transmitted through the quarter-wave plate and the polarizer, wherein the fingerprint detecting signal is used for detecting fingerprint information of a finger.

18 Claims, 6 Drawing Sheets

(51) Int. Cl.
*H01L 27/32* (2006.01)
*H01L 27/146* (2006.01)

(56) References Cited

U.S. PATENT DOCUMENTS

| | | | |
|---|---|---|---|
| 2015/0177884 A1 | 6/2015 | Han | |
| 2016/0283773 A1 | 9/2016 | Popovich et al. | |
| 2017/0357841 A1 | 12/2017 | Popovich et al. | |
| 2017/0372113 A1 | 12/2017 | Zhang et al. | |
| 2018/0005007 A1 | 1/2018 | Du et al. | |
| 2018/0031835 A1* | 2/2018 | Hoppe | G02F 1/13363 |
| 2018/0033835 A1 | 2/2018 | Zeng et al. | |
| 2018/0247143 A1* | 8/2018 | Cho | G06K 9/0004 |
| 2018/0314873 A1 | 11/2018 | Yang et al. | |
| 2018/0315803 A1* | 11/2018 | Jin | G06F 3/0412 |
| 2018/0357462 A1* | 12/2018 | Mackey | G06K 9/00026 |
| 2019/0042827 A1 | 2/2019 | Popovich et al. | |
| 2019/0079236 A1* | 3/2019 | Hung | G02F 1/133555 |
| 2019/0114457 A1 | 4/2019 | Li et al. | |
| 2019/0171050 A1 | 6/2019 | Chen et al. | |
| 2020/0012839 A1 | 1/2020 | Popovich et al. | |
| 2020/0117878 A1 | 4/2020 | Li et al. | |

FOREIGN PATENT DOCUMENTS

| | | |
|---|---|---|
| CN | 106845451 A | 6/2017 |
| CN | 107004130 A | 8/2017 |
| CN | 107025451 A | 8/2017 |
| CN | 107102693 A | 8/2017 |
| CN | 107170360 A | 9/2017 |
| CN | 107193412 A | 9/2017 |
| EP | 0935157 A2 | 8/1999 |
| GN | 105808006 A | 7/2016 |
| WO | 2015099410 A1 | 7/2015 |
| WO | 2017129126 A1 | 8/2017 |
| WO | 2018049944 A | 3/2018 |

\* cited by examiner

FINGERPRINT IDENTIFICATION APPARATUS AND ELECTRONIC DEVICE

CROSS-REFERENCE TO RELATED APPLICATIONS

This application is a continuation of International Application No. PCT/CN2019/086886, filed on May 14, 2019, which claims priority to International Application No. PCT/CN2018/091641, filed on Jun. 15, 2018. The disclosures of the aforementioned applications are hereby incorporated by reference in their entireties.

TECHNICAL FIELD

Embodiments of the present application relate to the field of fingerprint identification technologies, and in particular, to a fingerprint identification apparatus and an electronic device.

BACKGROUND

In the under-screen fingerprint identification technology, an optical fingerprint module is disposed under a display screen, an opening is made in a middle frame to allow a light reflected from a human finger above the display screen to enter the optical fingerprint module through the opening area.

When the display screen is used as a light source, there will be a downward leakage light under the display screen, and an upward light emitted by the display screen will generate a downward reflected light after being reflected by the finger, the leakage light and reflected light can irradiate to an opening cross-section of the middle frame and provide it with illumination, so that the opening cross-section of the middle frame forms a mirror image at a cover glass of the display screen, and the mirror image is collected by a fingerprint sensor in the optical fingerprint module to form an inverted image of a middle frame cross-section. The inverted image of the middle frame cross-section affects the quality of a fingerprint image, thereby affecting the fingerprint identification performance.

SUMMARY

A fingerprint identification apparatus and an electronic device are provided, which could improve the performance of fingerprint identification.

In a first aspect, provided is a fingerprint identification apparatus applicable for electronic devices with liquid crystal display screens, including:

an optical function layer, disposed between the display screen and a middle frame of the electronic device, wherein the optical function layer includes a quarter-wave plate and a polarizer, and the polarizer is disposed under the quarter-wave plate; and an optical fingerprint module, disposed under the optical function layer, and configured to receive a fingerprint optical signal transmitted through the quarter-wave plate and the polarizer, wherein the fingerprint optical signal is used for detecting fingerprint information of a finger.

In some possible implementations, a fast-axis of the quarter-wave plate is at an angle of 45° to a polarization direction of the polarizer.

In some possible implementations, the optical function layer further includes:

a filter layer, disposed above a light guiding layer in the optical fingerprint module, wherein the light guiding layer is configured to guide the fingerprint optical signal to an optical sensor in the optical fingerprint module, and the filter layer is configured to perform filtering processing on the fingerprint optical signal.

In some possible implementations, the filter layer is disposed above the quarter-wave plate.

In some possible implementations, the filter layer is disposed between the quarter-wave plate and the polarizer.

In some possible implementations, the filter layer is disposed under the polarizer.

In some possible implementations, the light guiding layer includes at least one of the following: a pinhole array, a lens, and a micro-lens array.

In some possible implementations, the fingerprint identification apparatus further includes:

an anti-reflecting film, disposed under the optical function layer.

In some possible implementations, the optical functional layer is adhered to a lower surface of the display screen.

In some possible implementations, the optical functional layer is disposed above an opening of the middle frame, and the opening is configured to pass the fingerprint optical signal.

In a second aspect, provided is an electronic device, including: a display screen; a middle frame;

the fingerprint identification apparatus of the first aspect or any possible implementation of the first aspect, wherein the quarter-wave plate and the polarizer in the identification apparatus are disposed between the display screen and the middle frame.

In some possible implementations, the middle frame is provided with an opening, and the quarter-wave plate and the polarizer are disposed above the opening, and the opening is configured to pass the fingerprint optical signal for fingerprint detection.

In some possible implementations, the display screen is an organic light-emitting diode display screen, and the display screen includes multiple organic light emitting diode light sources, wherein the fingerprint identification apparatus adopts at least some of the organic light emitting diode light sources as an excitation light source for fingerprint identification.

Based on the above technical solution, a quarter-wave plate and a polarizer are disposed between the display screen and the middle frame, and the quarter-wave plate is disposed above the polarizer, such that after a leakage light and a reflected light under the display screen reaching the opening cross-section of the middle frame, the reflected light from the opening cross-section of the middle frame is transmitted upward and is reflected again by a lower surface of the display screen, the transmission path of the reflected light to the optical fingerprint module is cut off, thereby eliminating an inverted image formed by the middle frame cross-section on the fingerprint image and improving the fingerprint identification performance.

DESCRIPTION OF EMBODIMENTS

The technical solutions in the embodiments of the present application will be described below with reference to the accompanying drawings.

As a common application scenario, the fingerprint identification apparatus provided by the embodiment of the present application can be applied to a smart phone, a tablet computer, and other mobile terminals or other terminal devices having a display screen; more specifically, in the above terminal devices, the fingerprint identification apparatus may be embodied as an optical fingerprint apparatus that may be placed in a partial or entire area under the display screen to form an under-display optical fingerprinting system.

Figure 1A:
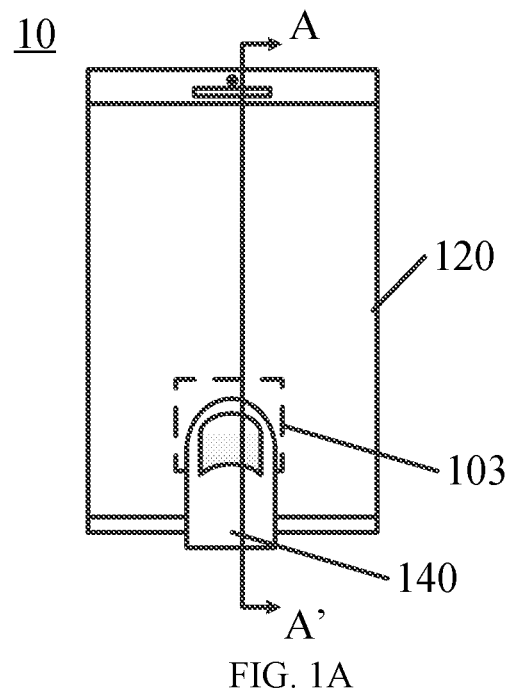
FIG. 1A is a directional view of an electronic device in accordance with an embodiment of the present application.
Figure 1B:
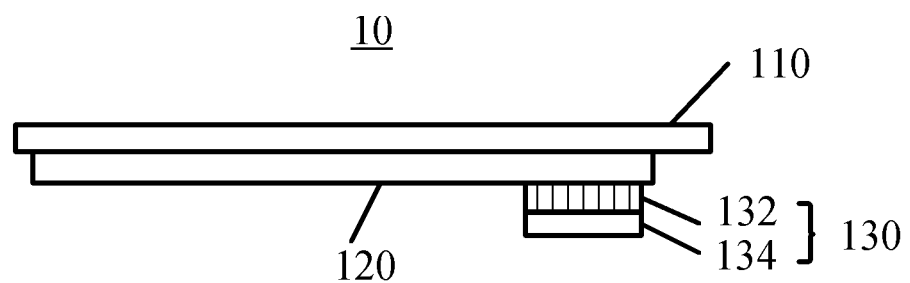
FIG. 1B is a partial schematic cross-sectional structural view of the electronic device shown in FIG. 1A taken along A'-A'.

FIG. 1A and FIG. 1B illustrate the schematic structural views of an electronic device applicable to the embodiments of the present application. FIG. 1A is a directional view of an electronic device 10, FIG. 1B is a partial schematic cross-sectional structural view of the electronic device 10 shown in FIG. 1A taken along A'-A'.

As shown in FIGS. 1A and 1B, the electronic device 10 includes a display screen 120 and an optical fingerprint apparatus 130, wherein the optical fingerprint apparatus 130 is disposed in a partial area under the display screen 120, for example, under a middle area of the display screen. The optical fingerprint apparatus 130 includes an optical fingerprint sensor, and the optical fingerprint sensor has a sensing array having a plurality of optical sensing units, the area where the inductive array is located or the sensing area thereof is the fingerprint detecting area 103 of the optical fingerprint apparatus 130. As shown in FIG. 1A, the fingerprint detecting area 103 is located in the display area of the display screen 120.

It should be understood that an area of the fingerprint detecting area 103 may be different from an area of the sensing array of the optical fingerprint apparatus 130, for example, by optical path design such as lens imaging, reflective folding optical path design, or other light convergence or reflection optical design, such that the area of the fingerprint detecting area 103 of the optical fingerprint apparatus 130 is larger than the area of the sensing array of the optical fingerprint apparatus 130. In other alternative implementations, if optical path guidance is performed by using, for example, a light collimation method, the area of the fingerprint detecting area 103 of the optical fingerprint apparatus 130 can also be designed to be substantially the same as the area of the sensing array of the optical fingerprint apparatus 130.

Therefore, when the user needs to unlock the electronic device or perform other fingerprint verification, a fingerprint input operation may be implemented merely by pressing a finger on the fingerprint detecting area 103 located in the display screen 120. Since the fingerprint detection can by implemented within a screen, there is no need to reserve space on the front side of the electronic device 10 adopting the foregoing structure to set a fingerprint button (such as a Home button), so that a full screen solution can be adopted, that is the display area of the display screen 120 can be substantially extended to the entire front surface of the electronic device 10.

As an alternative implementation, as shown in FIG. 1B, the optical fingerprint apparatus 130 includes an optical component 132 and a light detecting portion 134, the light detecting portion 134 includes the light detecting array 400 and a reading circuit and other auxiliary circuits connected electrically with the light detecting array, the optical fingerprint apparatus may be fabricated on a die by semiconductor process, such as an optical imaging die or an optical fingerprint sensor, and the sensing array is specifically a photo detector array, which includes a plurality of photo detectors distributed in an array, the photo detectors can be used as the optical sensing units as described above; the optical component 132 can be disposed above the sensing array of the light detecting portion 134, it may specifically include a filter layer, a light guiding layer or an optical path guiding structure, and other optical elements, the filter layer may be used to filter out an ambient light penetrating the finger, for example, an infrared light interfering with the imaging, and the light guiding layer or the optical path guiding structure is mainly used for guiding a reflected light reflected from a surface of the finger to the sensing array for optical detection.

In a specific implementation, the optical component 132 can be packaged in a same optical fingerprint component as the light detecting portion 134. For example, the optical component 132 may be packaged in the same optical fingerprint die as the light detecting portion 134, or the optical component 132 may be disposed outside the die where the light detecting portion 134 is located, such as the optical component 132 is attached over the die, or part of the elements of the optical component 132 are integrated into the die.

The light guiding layer or the optical path guiding structure of the optical component 132 has various implementations, for example, the light guiding layer may be specifically a collimator layer made in a semiconductor silicon wafer, which has a plurality of collimating unit or micro-hole array, wherein the collimating unit may be specifically a small hole, and among the reflected light reflected from the finger, the light of which an incident direction is perpendicular to the collimating unit may pass through and be received by the optical sensing unit, and the light having an excessive incident angle is attenuated by multiple reflections inside the collimating unit, so each optical sensing unit can substantially only receive a reflected light reflected from the fingerprint directly above it, so that the sensing array can detect the fingerprint image of the finger.

In another embodiment, the light guiding layer or the optical path guiding structure may also be an optical lens layer having one or more lens units, such as a lens group composed of one or more aspherical lenses, and the optical lens layer is configured to converge a reflected light reflected from the finger to the light detecting portion 134 under it, such that the sensing array can perform the imaging based on the reflected light, thereby obtaining a fingerprint image of the finger. Optionally, the optical lens layer may further form a pinhole in an optical path of the lens unit, and the pinhole may cooperate with the optical lens layer to expand a field of view of the optical fingerprint apparatus to improve the optical fingerprint imaging effect of the fingerprint apparatus 130.

In other embodiments, the light guiding layer or the optical path guiding structure may also specifically adopt a micro-Lens layer having a micro-lens array formed by a plurality of micro-lenses, and the micro-Lens layer may be generated above the sensing array of the light detecting portion 134 by a semiconductor growth process or other process, and each of the micro-lenses may correspond to one of the sensing units of the sensing array, respectively. Moreover, other optical film layer, such as a medium layer or a passivation layer, may be formed between the micro-lens layer and the sensing unit, more specifically, a light blocking layer having a pinhole may further exist between the micro-lens layer and the sensing unit, wherein the pinhole is formed between its corresponding micro-lens and the sensing unit, the light blocking layer can block the optical interference between the adjacent micro-lenses and the sensing unit, and converge a corresponding light of the sensing unit to the inside of the pinhole through the micro-lens, and the light is transmitted to the sensing unit through the pinhole for optical fingerprint imaging.

It should be understood that several implementations of the optical path guiding structure described above may be used alone or in combination, for example, a micro-lens layer may be further disposed under the collimating layer or the optical lens layer. Certainly, when the collimating layer or the optical lens layer is used in combination with the micro-lens layer, a specific stacked structure or the optical path may need to be adjusted according to actual needs.

As an alternative embodiment, the display screen 120 may adopt a display screen having a self-emitting display unit, for example, an organic light-emitting diode (OLED) display screen or a micro light-emitting diode (micro-LED) display screen. Taking a display screen adopting an OLED display screen as an example, the optical fingerprint apparatus 130 can utilize an OLED display unit (that is, an OLED light source) located in the fingerprint detecting area 103 of the OLED display screen 120 as an excitation light source for optical fingerprint detection. When the finger presses in the fingerprint detecting area 103, the display screen 120 emits a beam of light to a target finger above the fingerprint detecting area 103, and the light is reflected on the surface of the finger to form a reflected light or scattered through the inside of the finger to form a scattered light. In related patent applications, for the convenience of description, the above reflected light and scattered light are collectively referred to as reflected light. Since a ridge and a valley of the fingerprint have different light reflecting ability, the reflected light from the fingerprint ridge and that from the fingerprint valley have different light intensities, after passing through the optical component, the reflected light is received by the sensing array in the optical fingerprint apparatus and converted into a corresponding electrical signal, that is, a fingerprint detecting signal; based on the fingerprint detecting signal, fingerprint image data can be obtained, and fingerprint matching verification can be further performed, thereby the optical fingerprint identification function can be implemented by the electronic device 10.

In other embodiments, the optical fingerprint apparatus 130 may also provide an optical signal for fingerprint detection by adopting an internal light source or an external light source. In this case, the optical fingerprint apparatus 130 may be applied to a non-self-emitting display screen such as a liquid crystal display screen or other passive light-emitting display screens. Taking the liquid crystal display screen having a backlight module and liquid crystal panel as an example, in order to support the under-screen fingerprint detection of the liquid crystal display screen, the electronic device 10 may further include an excitation light source for optical fingerprint detection, the excitation light source may be an infrared light source or a non-visible light source having a specific wavelength, which may be disposed under the backlight module of the liquid crystal display screen or disposed at an edge region under a protective cover of the electronic device 10, and the optical fingerprint apparatus 130 can be disposed under an edge region of the liquid crystal panel or the protective cover and guided by an optical path, so that a fingerprint detecting light can reach the optical fingerprint apparatus 130; or the optical fingerprint apparatus 130 can also be disposed under the backlight module, and the backlight module enables the fingerprint detection light to pass through the liquid crystal panel and the backlight module and reach the optical fingerprint apparatus 130 by making an opening or other optical design on a diffusion film, a brightening film, a reflection film, and the like. When the optical fingerprint apparatus 130 provides an optical signal for fingerprint detection by adopting an internal light source or an external light source, the detecting principle is consistent with the above description.

It should be understood that, in a specific implementation, the electronic device 10 further includes a transparent protective cover located above the display screen 120 and covering a front surface of the electronic device 10. Therefore, in an embodiment of the present application, the so-called pressing the display screen 120 by a finger may actually refer to pressing the cover above the display screen 120 or covering a surface of the protective layer of the cover.

On the other hand, in some embodiments, the optical fingerprint apparatus 130 may include only one optical fingerprint sensor, at this time, the fingerprint detecting area 103 of the optical fingerprint apparatus 130 has a small area and a fixed position, so the user's finger needs press to a specific position of the fingerprint detecting area 103 when the fingerprint input is performed, otherwise, the optical fingerprint apparatus 130 may not collect the fingerprint image and cause a poor user experience. In other alternative embodiments, the optical fingerprint apparatus 130 may specifically include a plurality of optical fingerprint sensors; the plurality of optical fingerprint sensors may be disposed side by side in a splicing manner in a middle region of the display screen 120, and the plurality of the optical fingerprint sensors constitute the fingerprint detecting area 103 of the optical fingerprint apparatus 130 together. That is to say, the fingerprint detecting area 103 of the optical fingerprint apparatus 130 may include a plurality of sub-areas, each of which corresponds to a sensing area of one of the optical fingerprint sensors, thereby the detection area 103 of the optical fingerprint module 130 can be extended to a main area of the middle region of the display screen, that is, to the customary finger pressing area, thereby implementing a blind-type fingerprint input operation. Alternatively, when the number of the optical fingerprint sensors is sufficient, the fingerprint detecting area 103 can also be expanded to half of the display area or even the entire display area, thereby implementing half screen or full screen fingerprint detection.

Optionally, in some embodiments of the present application, the optical fingerprint apparatus 130 may further include a circuit board for transmitting a signal (such as the fingerprint detecting signal). For example, the circuit board may be a flexible printed circuit board (FPC). The optical fingerprint sensor can be connected to the FPC, and electrical interconnection and signal transmission with other peripheral circuits or other elements of the electronic device are implemented by the FPC. For example, the optical fingerprint sensor may receive a control signal of a processing unit of the electronic device through the FPC, and may also output the fingerprint detecting signal to the processing unit, control unit or the like of the electronic device through the FPC.

Figure 2:
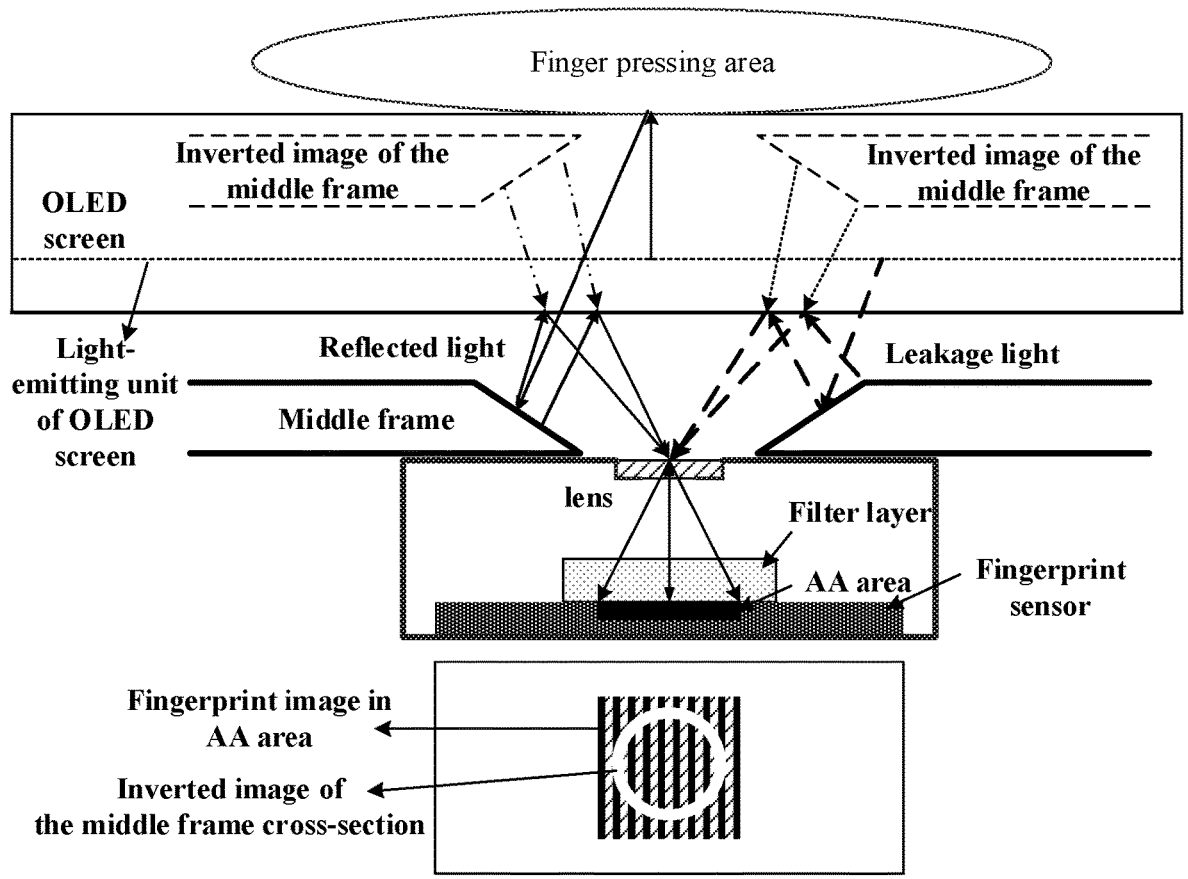
FIG. 2 is a schematic view showing the formation of an inverted image of the middle frame cross-section.

In some cases, as shown in FIG. 2, an excitation light source for fingerprint detection by adopting a self-emitting display unit of the OLED screen is taken as an example. A light emitted by the self-emitting display unit of the OLED screen will cause light leakage under the display screen, and an upward light emitted by the display screen will generate a downward reflected light after being reflected by a finger, the leakage light and reflected light can irradiate to the opening cross-section of the middle frame and provide it with illumination, so that the opening cross-section of the middle frame forms a mirror image at a cover glass of the display screen, the mirror image is transmitted to the area where the fingerprint sensor in the optical fingerprint module is located, that is, an AA area, and is collected by the fingerprint sensor, and the formed image includes an inverted image of a middle frame cross-section, which affects the fingerprint identification performance.

Therefore, an embodiment of the present application provides a technical solution to improve the fingerprint identification performance.

It should be understood that the embodiment of the present application is only described as an example by using the excitation light source for fingerprint detection by adopting a self-emitting display unit of the OLED screen, the embodiment of the present application can also be applied to other fingerprint identification apparatus having an excitation light source for detection by adopting other internal light source or an external light source.

Figure 3:
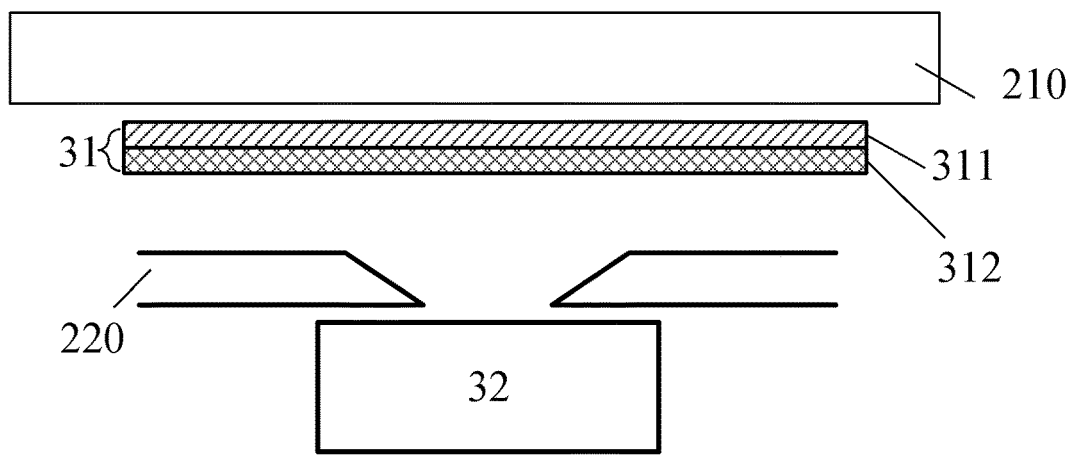
FIG. 3 is a schematic structural view of a fingerprint identification apparatus according to an embodiment of the present application.

FIG. 3 is a schematic structural view of a fingerprint identification apparatus according to an embodiment of the present application, which is applicable for electronic devices with a display screen.

As shown in FIG. 3, the fingerprint identification apparatus may include:

an optical function layer 31, disposed between the display screen 210 and the middle frame 220 of the electronic device, wherein the optical function layer 31 includes a quarter-wave plate 311 and a polarizer (POL) 312, and the polarizer 312 is disposed under the quarter-wave plate 311; and an optical fingerprint module 32, disposed under the optical function layer 31, and configured to receive a fingerprint optical signal transmitted through the quarter-wave plate 311 and the polarizer 312, wherein the fingerprint optical signal is used for detecting fingerprint information of a finger.

It should be understood that the fingerprint optical signal herein may be an optical signal reflected or scattered from the surface of the user's finger, and the fingerprint optical signal carries the fingerprint information of the user's finger, and the fingerprint optical signal may correspond to the fingerprint detecting signal in FIG. 1, reference is made to the related description of the foregoing embodiments, and details are not described herein again.

Optionally, the middle frame is provided with an opening, the optical functional layer is disposed above the opening of the middle frame, and the opening is configured to pass the fingerprint optical signal.

Optionally, as an embodiment, the optical function layer 31 may be disposed on a lower surface of the display screen 210. For example, the optical function layer 31 may be adhered by an optical adhesive or other transparent adhesive material to the lower surface of the display screen 210.

Optionally, as another embodiment, the optical function layer 31 may be disposed on an upper surface of the opening of the middle frame 220. For example, the optical function layer 31 may be adhered by an optical adhesive or other transparent adhesive material to a region without an opening above the opening of the middle frame.

Optionally, as another embodiment, the optical function layer 31 may be disposed between the display screen 210 and the middle frame 220 of the electronic device, and is independent from the display screen 210 and the middle frame 220, for example, the optical functional layer 31 can be disposed between the display screen 210 and the middle frame 220 of the electronic device by a support.

Alternatively, in some embodiments, the polarizer 312 is adhered to a lower surface of the quarter-wave plate 311 by an optical adhesive or other transparent adhesive material.

In the embodiment of the present application, a quarter-wave plate and a polarizer are disposed between the display screen and the middle frame of the electronic device, and the quarter-wave plate is disposed above the polarizer, such that the transmission path of the leakage light and the reflected light to the optical fingerprint module is cut off, and the inverted image of the opening cross-section of the middle frame formed on the optical fingerprint module is eliminated, thereby improving the fingerprint identification performance.

Optionally, in the embodiment of the present application, a fast-axis of the quarter-wave plate 311 is at an angle of 45° to a polarization direction of the polarizer 312. Or a slow-axis of the quarter-wave plate 311 is at an angle of 45° to a polarization direction of the polarizer 312.

Optionally, in some embodiments, the display screen 210 may include a light-emitting unit configured to provide an optical signal for fingerprint identification. The light emitting unit may include a light source, for example, for the OLED display screen, the light emitting unit includes a plurality of organic light emitting diode light sources, and alternatively, the display screen 210 may also be other display screens, for example, a liquid crystal display screen or other passive light-emitting display screens.

Optionally, the display screen 210 may also include a quarter-wave plate and a polarizer, wherein the quarter-wave plate is disposed above the light emitting unit, and the polarizer is disposed above the quarter-wave plate.

It should be understood that the display screen 210 may further include other intrinsic components, such as a substrate and a cover glass, but the embodiments of the present application are not limited thereto.

Figure 4:
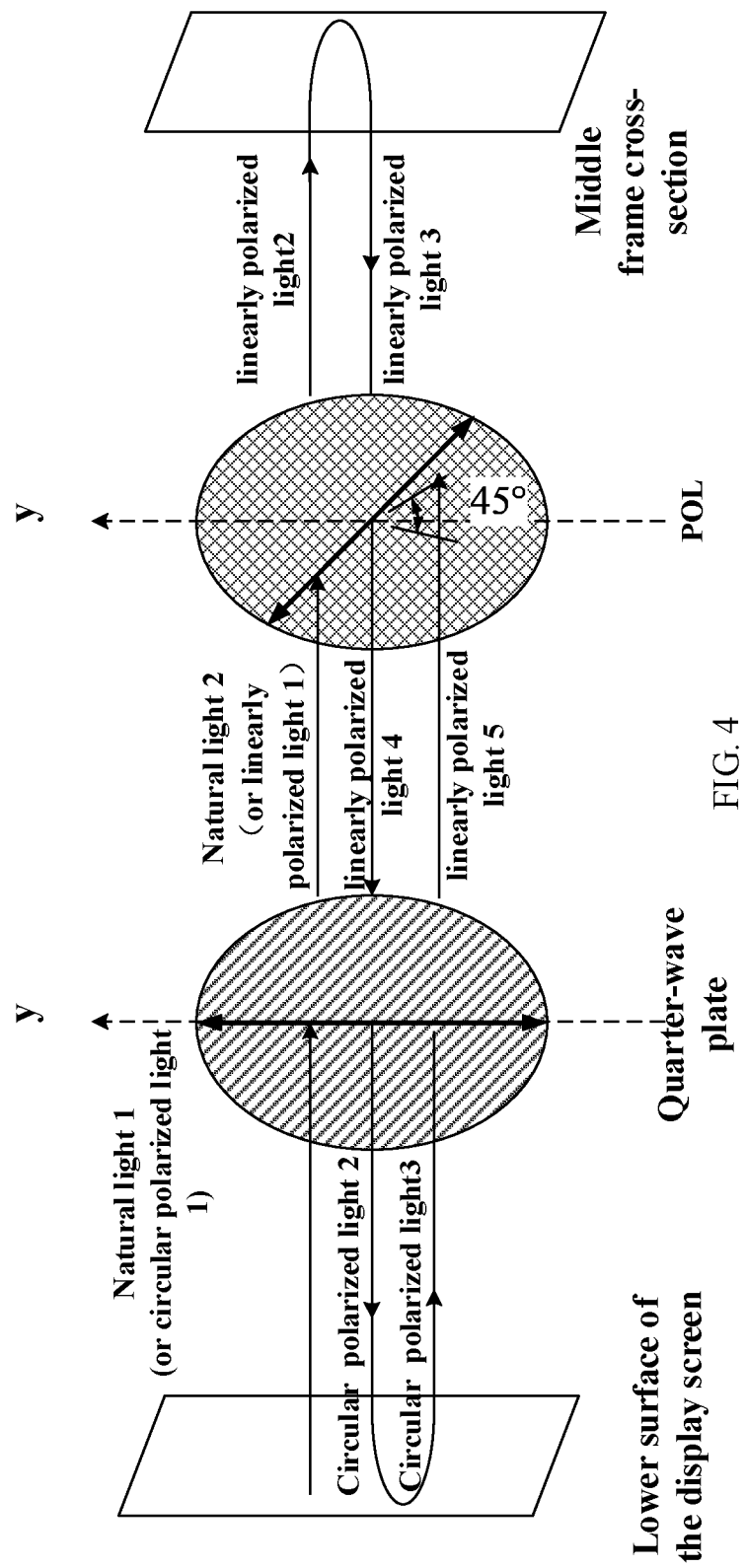
FIG. 4 and FIG. 5 are operating principle diagrams of a fingerprint identification apparatus according to an embodiment of the present application.
Figure 5:
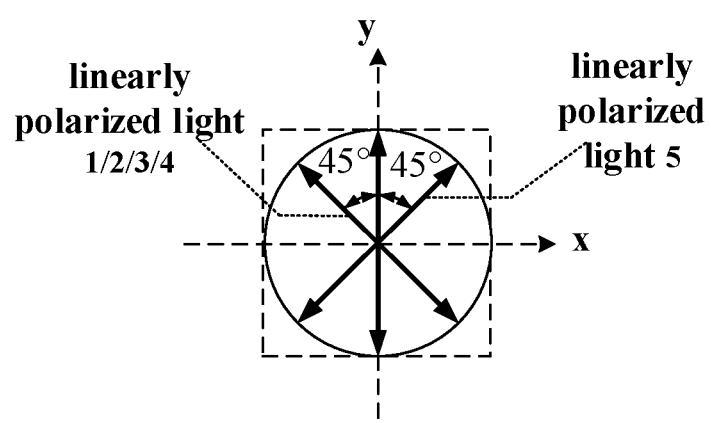

In combination with FIG. 4 and FIG. 5, an operating principle of the fingerprint identification apparatus according to an embodiment of the present application is described, wherein the y-axis is the fast-axis of the quarter-wave plate, and the x-axis is the slow-axis of the quarter-wave plate.

A leakage light from a lower surface of the display screen is a natural light emitted from a lower part of the display screen, it is recorded as natural light 1, a reflected light is a circularly polarized light after passing through the polarizer and the quarter-wave plate inside the display screen, and is recorded as circularly polarized light 1. The natural light 1 and the circularly polarized light 1 are sequentially transmitted through the quarter-wave plate 311 and the polarizer 312 in the fingerprint identification apparatus to become a linearly polarized light 2 which provides illumination for the middle frame 220, and the linearly polarized light 2 becomes a linearly polarized light 3 after being reflected by the cross-section of the middle frame 220, and the linearly polarized light 3 becomes a circularly polarized light 2 after transmitting upward through the quarter-wave plate 311 and the polarizer 312, the circularly polarized light 2 is reflected by the lower surface of the display screen to generate a reverse rotated circularly polarized light 3, and the circularly polarized light 3 passes through the quarter-wave plate 311 and the polarizer 312 to generate a linearly polarized light 5, since a polarization direction of the linearly polarized light 5 is perpendicular to a polarization direction of the polarizer 312, the linearly polarized light 5 cannot pass through the polarizer 312. In this way, after the leakage light and the reflected light are transmitted downward to reach the middle frame, the transmission path of the reflected light (that is the polarized light 3) of the middle frame cross-section transmitted upward and reflected by the lower surface of the display screen to the optical fingerprint module is cut off, thereby eliminating an inverted image of the middle frame cross-section on the fingerprint image collected by the optical sensor.

Figure 6:
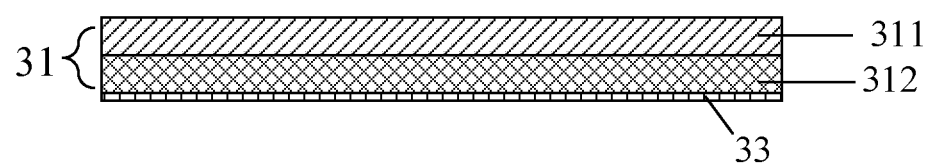
FIG. 6 is a schematic view of a setting mode of an anti-reflecting film according to an embodiment of the present application.

Optionally, in one embodiment of the present application, as shown in FIG. 6, the fingerprint identification apparatus may further include:

an anti-reflecting film 33, disposed under the optical function layer 31.

Figure 7:
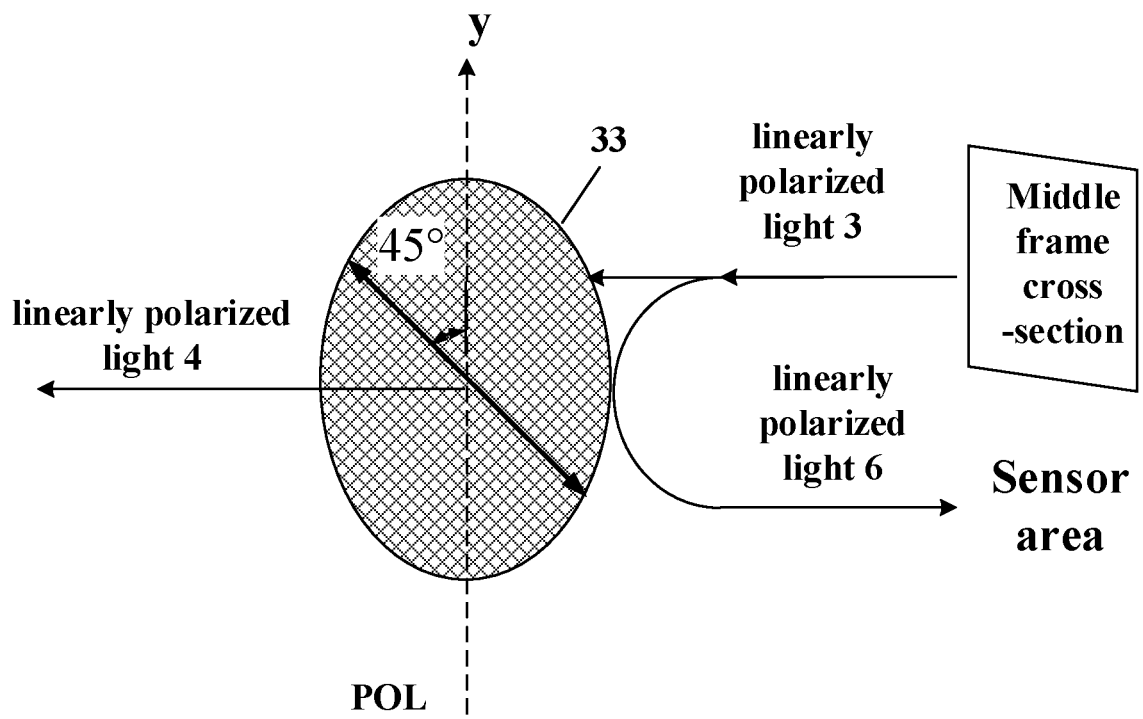
FIG. 7 is an operating principle diagram of an anti-reflecting film according to an embodiment of the present application.

As shown in FIG. 7, most of the linearly polarized light 3 reflected from the cross-section of the middle frame 220 is transmitted through the polarizer 312 to generate the linearly polarized light 4, but it is also possible that a small part of the light is reflected on a lower surface of the polarizer 312, and generate a downward weak linearly polarized light 6, the linearly polarized light 6 may also form an inverted image of the middle frame cross-section after reaching the optical sensor of the optical fingerprint module 32. In the embodiment of the present application, an anti-reflection film 33 is disposed under the polarizer 312, which can weaken the linearly polarized light 6 generated by the reflection on the lower surface of the polarizer 312, and increase the magnitude of the linearly polarized light 4 transmitted upward, thereby attenuating the inverted image of the middle frame cross-section in the fingerprint image.

Optionally, in an embodiment of the present application, the optical fingerprint module 32 may include an optical component and an optical sensor, and the optical component may include a filter layer, a light guiding layer or an optical path guiding structure, and other optical elements, the filter layer can be used to filter out an ambient light penetrating the finger, for example, an infrared light interfering with the imaging, and the light guiding layer or the light path guiding structure is mainly used for guiding the reflected light reflected from the surface of the finger to the sensing array to perform the optical detection.

It should be understood that the optical component and the optical sensor may correspond to the optical component 132 and the light detecting portion 134 in FIG. 1 respectively, for details, please refer to the foregoing embodiment, and details are not described herein again.

Optionally, in some embodiments, the filter layer in the optical fingerprint module 32 may be disposed between the optical sensor and the light guiding layer for filtering a fingerprint optical signal entering the optical sensor.

Optionally, in other embodiments, the filter layer may also be disposed independently, for example, since the optical function layer is a separate structure, the filter layer may be disposed together with the optical function layer.

Figure 8:
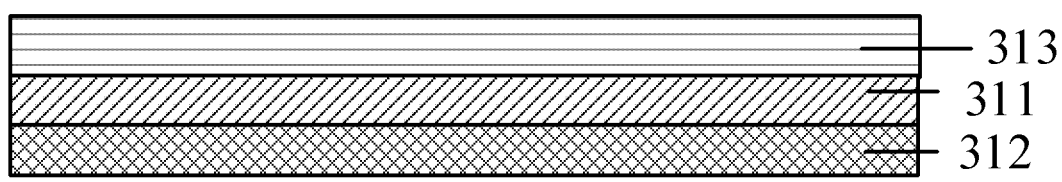
FIG. 8 is a schematic structural view of an optical function layer according to an embodiment of the present application.

As an embodiment, as shown in FIG. 8, the filter layer 313 is disposed above the quarter-wave plate 311. In a specific embodiment, the filter layer 313 may be disposed on an upper surface of the quarter-wave plate 311 or on a lower surface of the display screen 210. For example, the filter layer 313 may be adhered to the upper surface of the quarter-wave plate 311 or to the lower surface of the display screen 210 by an optical adhesive or other transparent adhesive materials.

Figure 9:
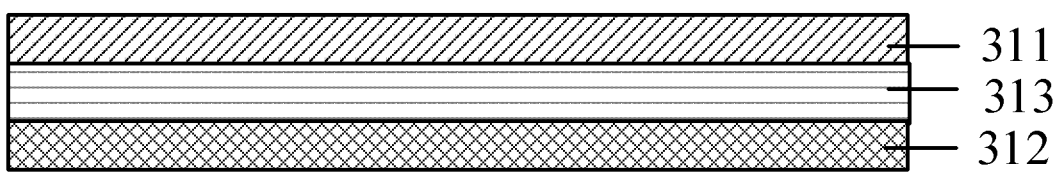
FIG. 9 is another schematic structural view of an optical function layer according to an embodiment of the present application.

As another embodiment, as shown in FIG. 9, the filter layer 313 may be disposed between the quarter-wave plate 311 and the polarizer 312. Specifically, the filter layer 313 may be adhered between the quarter-wave plate 311 and the polarizer 312 by an optical adhesive or other transparent adhesive materials.

Figure 10:
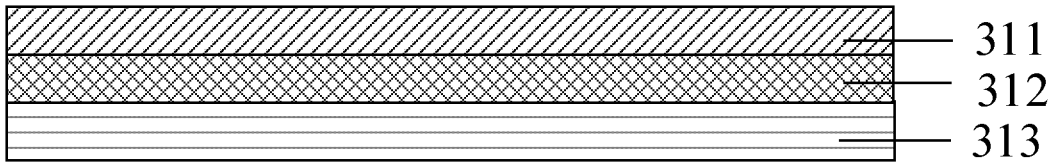
FIG. 10 is another schematic structural view of an optical function layer according to an embodiment of the present application.

As another embodiment, as shown in FIG. 10, the filter layer 313 is disposed under the polarizer 312. For example, the filter layer 313 may be adhered to the lower surface of the polarizer 312 by an optical adhesive or other transparent adhesive material.

In the case where the optical function layer includes the filter layer 313, the anti-reflection film 33 may be disposed under the bottom layer among the filter layer 313, the quarter-wave plate 311 and the polarizer 312.

Figure 11:
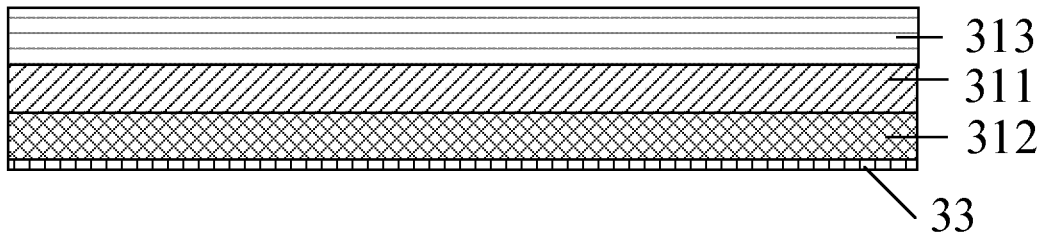
FIG. 11 is a schematic view of a setting mode of an anti-reflecting film according to an embodiment of the present application.

For example, if the filter layer 313 is disposed above the quarter-wave plate 311, the anti-reflection film 33 may be disposed on the lower surface of the polarizer 312, as shown in FIG. 11.

Figure 12:
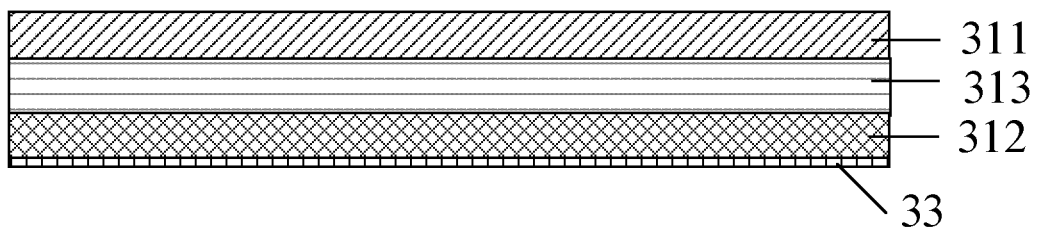
FIG. 12 is a schematic view of another setting mode of an anti-reflecting film according to an embodiment of the present application.

For another example, if the filter layer 313 can be disposed between the quarter-wave plate 311 and the polarizer 312, the anti-reflection film 33 can be disposed on the lower surface of the polarizer 312, as shown in FIG. 12.

Figure 13:
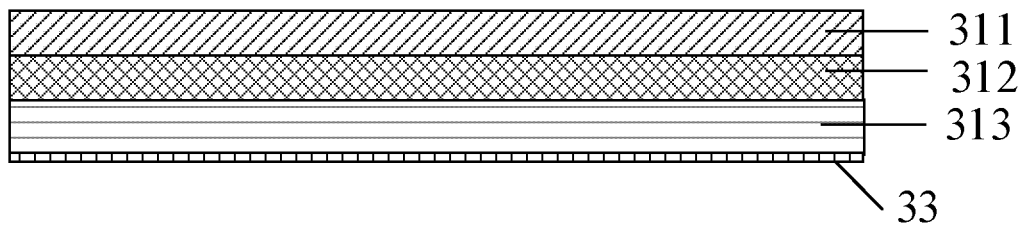
FIG. 13 is a schematic view of another setting mode of an anti-reflecting film according to an embodiment of the present application.

For another example, if the filter layer 313 is disposed under the polarizer 312, the anti-reflection film 33 may be disposed on the lower surface of the filter layer 313, as shown in FIG. 13.

Therefore, according to the fingerprint identification apparatus of the embodiment of the present application, a quarter-wave plate and a polarizer are disposed between the display screen and the middle frame, and the quarter-wave plate is disposed above the polarizer, such that after the leakage light and the reflected light under the display screen reaching the opening cross-section of the middle frame, the reflected light from the opening cross-section of the middle frame is transmitted upward and is reflected again by a lower surface of the display screen, the transmission path of the reflected light to the optical fingerprint module is cut off, thereby eliminating the inverted image formed by the middle frame cross-section on the fingerprint image and improving the fingerprint identification performance.

Optionally, in some embodiments, the fingerprint identification apparatus may further include:

a flexible printed circuit, the optical sensor is disposed above the flexible printed circuit, and is soldered to the flexible printed circuit through a soldering pad to implement an electrical interconnection with a peripheral circuits.

Optionally, in some embodiments, the fingerprint identification apparatus may further include:

a support, disposed above the flexible circuit board and forming a cavity with the flexible circuit board, wherein the optical sensor is disposed in the cavity.

Optionally, in some embodiments, the fingerprint identification apparatus may further include:

a foam, the support is connected to the middle frame of the electronic device by the foam, wherein the middle frame is disposed between the display screen and a back cover of the electronic device and is used to carry a frame of the internal components of the electronic device.

Figure 14:
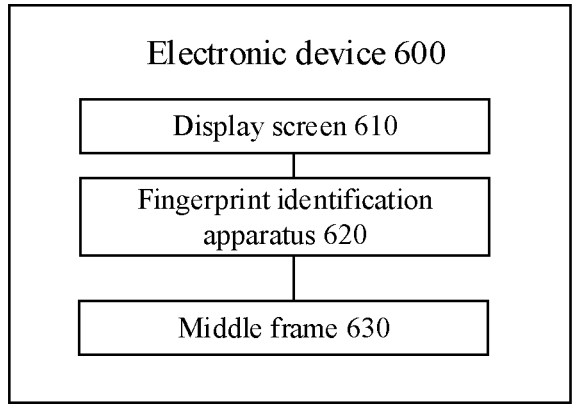
FIG. 14 is a schematic structural view of an electronic device in accordance with an embodiment of the present application.

The embodiment of the present application further provides an electronic device, as shown in FIG. 14, the electronic device 600 may include: a display screen 610, a fingerprint identification apparatus 620, and a middle frame 630, wherein the quarter-wave plate and the polarizer in the fingerprint identification apparatus 620 are disposed between the display screen 610 and the middle frame 630.

The electronic device 600 can be any electronic devices having a display screen, which implements the fingerprint identification by adopting the technical solution of the embodiment of the present application.

The fingerprint identification apparatus 620 may be the fingerprint identification apparatus in the foregoing various embodiments of the present application. For specific implementations, reference may be made to the related descriptions in the foregoing, and no further details are provided herein.

The display screen may adopt the foregoing display screen 610, such as an OLED display or other display screen. Relative description of the display screen may refer to the foregoing description of the display screen, and for brevity, no further details are provided herein.

Optionally, the display screen 610 is an organic light-emitting diode display screen, and the light emitting unit of display screen 610 includes multiple organic light emitting diode light sources, wherein the fingerprint identification apparatus adopts at least some of the organic light emitting diode light sources as an excitation light source for fingerprint identification.

It should be understood that the specific examples in the embodiments of the present application are only intended to help those skilled in the art to better understand the embodiments of the present application.

It should also be noted that, terms used in embodiment of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

Those of ordinary skill in the art may be aware that, various exemplary units described in combination with the embodiments disclosed herein may be implemented by electronic hardware, computer software or a combination of both, to clearly illustrate the interchangeability of hardware and software, the components and steps of the various embodiments have been generally described in terms of functionality in the foregoing description. Whether these functions are executed in hardware or software mode depends on a particular application and a design constraint condition of the technical solution. Persons skilled in the art may use different methods to implement the described functions for every particular application, but it should not be considered that such implementation goes beyond the scope of the present application.

In the several embodiments provided by the present application, it should be understood that the disclosed system and apparatus may be implemented in other manners. For example, the apparatus described in the foregoing embodiments are merely illustrative. For example, the division of the unit is only a division of logical function. In actual implementation, there may be another division manner, for example, multiple units or components may be combined or may be integrated into another system, or some features can be ignored or not executed. In addition, the mutual coupling or direct coupling or communication connection shown or discussed may be an indirect coupling or communication connection through certain interface, device or unit, or an electrical, mechanical or other form of connection.

The units described as separate components may or may not be physically separated, and the components used as display units may or may not be physical units, that is, may be located in one place, or may be distributed to multiple network units. Depending on the actual needs, part or all of the units may be selected to achieve the purpose of the embodiments of the present application.

In addition, each functional unit in each embodiment of the present application may be integrated into one processing unit, or each unit may be physical existence separately, or two or more units may be integrated into one unit. The foregoing integrated unit may be implemented in the form of hardware or in the form of a software functional unit.

If the integrated unit is implemented in the form of a software functional unit and sold or used as a standalone product, it may be stored in a readable storage medium of a computer. Based on such understanding, the technical solution of the present application in essence or the part making contribution to the prior art, or all or part of the technical solution may be embodied in the form of a software product, the computer software product is stored in a storage medium and includes a number of instructions for instructing a computer device (may be a personal computer, server, or network device, etc.) to perform all or part of the steps of the methods described in various embodiments of the present application. The foregoing storage medium includes: U disk, mobile hard disk, read-only memory (ROM), random access memory (RAM), a magnetic disk, or an optical disk, and the like that may store program code.

The foregoing contents are merely a specific implementation of the embodiments of the present application, but the protection scope of the present application is not limited thereto. Various modifications or replacements may be readily conceivable to any person skilled in the art within the technical scope disclosed in the present application, and such modifications or replacements shall fall within the protection scope of the present application. Therefore, the protection scope of the embodiments the present application shall be defined by the claims.

What is claimed is:

1. A fingerprint identification apparatus, applicable for an electronic device with display screen, comprising:
an optical function layer, disposed between a display screen and a middle frame of the electronic device, wherein the optical function layer comprises a quarter-wave plate and a polarizer, and the polarizer is disposed under the quarter-wave plate; and
an optical fingerprint module, disposed under the optical function layer, and configured to receive a fingerprint optical signal transmitted through the quarter-wave plate and the polarizer, wherein the fingerprint optical signal is used for detecting fingerprint information of a finger;
wherein the optical function layer further comprises:
a filter layer, disposed above a light guiding layer in the optical fingerprint module, wherein the light guiding layer is configured to guide the fingerprint optical signal to an optical sensor in the optical fingerprint module, and the filter layer is configured to perform filtering processing on the fingerprint optical signal.

2. The fingerprint identification apparatus according to claim 1, wherein a fast-axis of the quarter-wave plate is at an angle of 45° to a polarization direction of the polarizer.

3. The fingerprint identification apparatus according to claim 1, wherein the filter layer is disposed above the quarter-wave plate.

4. The fingerprint identification apparatus according to claim 1, wherein the filter layer is disposed between the quarter-wave plate and the polarizer.

5. The fingerprint identification apparatus according to claim 1, wherein the filter layer is disposed under the polarizer.

6. The fingerprint identification apparatus according to claim 1, wherein the light guiding layer comprises at least one of the following: a pinhole array, a lens, and a micro-lens array.

7. The fingerprint identification apparatus according to claim 1, wherein the fingerprint identification apparatus further comprises:
an anti-reflecting film, disposed under the optical function layer.

8. The fingerprint identification apparatus according to claim 1, wherein the optical function layer is adhered to a lower surface of the display screen.

9. The fingerprint identification apparatus according to claim 1, wherein the optical functional layer is disposed above an opening of the middle frame, and the opening is configured to pass the fingerprint optical signal.

10. An electronic device, comprising: a display screen, a middle frame, and a fingerprint identification apparatus, wherein the fingerprint identification apparatus comprises:
an optical function layer, disposed between a display screen and a middle frame of the electronic device, the optical function layer comprises a quarter-wave plate and a polarizer, and the polarizer is disposed under the quarter-wave plate; and
an optical fingerprint module, disposed under the optical function layer, and configured to receive a fingerprint optical signal transmitted through the quarter-wave plate and the polarizer, wherein the fingerprint optical signal is used for detecting fingerprint information of a finger;
wherein the optical function layer further comprises:
a filter layer, disposed above a light guiding layer in the optical fingerprint module, wherein the light guiding layer is configured to guide the fingerprint optical signal to an optical sensor in the optical fingerprint module, and the filter layer is configured to perform filtering processing on the fingerprint optical signal.

11. The electronic device according to claim 10, wherein a fast-axis of the quarter-wave plate is at an angle of 45° to a polarization direction of the polarizer.

12. The electronic device according to claim 10, wherein the filter layer is disposed above the quarter-wave plate.

13. The electronic device according to claim 10, wherein the filter layer is disposed between the quarter-wave plate and the polarizer.

14. The electronic device according to claim 10, wherein the filter layer is disposed under the polarizer.

15. The electronic device according to claim 10, wherein the light guiding layer comprises at least one of the following: a pinhole array, a lens, and a micro-lens array.

16. The electronic device according to claim 10, wherein the fingerprint identification apparatus further comprises:
an anti-reflecting film, disposed under the optical function layer.

17. The electronic device according to claim 10, wherein the optical functional layer is disposed above an opening of the middle frame, and the opening is configured to pass the fingerprint optical signal.

18. The electronic device according to claim 10, wherein the display screen is an organic light-emitting diode display screen, and the display screen comprises multiple organic light emitting diode light sources, wherein the fingerprint identification apparatus adopts at least some of the organic light emitting diode light sources as an excitation light source for fingerprint identification.

* * * * *